United States Patent [19]
Ahn

[11] Patent Number: 5,995,800
[45] Date of Patent: Nov. 30, 1999

[54] MINIMIZED OFFICE AUTOMATED MACHINE

[75] Inventor: Byung-Sun Ahn, Kyungki-do, Rep. of Korea

[73] Assignee: SamSung Electronics Co., Ltd., Kyungki-do, Rep. of Korea

[21] Appl. No.: 08/922,313

[22] Filed: Sep. 2, 1997

[30] Foreign Application Priority Data

Aug. 30, 1996 [KR] Rep. of Korea ................ 96-37156

[51] Int. Cl.⁶ .................... G03G 15/00; H04N 1/04
[52] U.S. Cl. ........................... 399/361; 358/498
[58] Field of Search .................... 358/474, 496, 358/498; 399/361, 372, 373, 381, 388, 391, 392, 393, 394, 108, 124, 405, 365, 107; 271/186, 306; 346/160

[56] References Cited

U.S. PATENT DOCUMENTS

| | | |
|---|---|---|
| 5,038,228 | 8/1991 | Takada ............................ 358/498 |
| 5,329,373 | 7/1994 | Hayashi et al. . |
| 5,387,980 | 2/1995 | Baitz et al. . |
| 5,552,902 | 9/1996 | Kohno . |
| 5,559,609 | 9/1996 | Yamada et al. . |
| 5,826,133 | 10/1998 | Saito et al. ............................ 399/2 |

FOREIGN PATENT DOCUMENTS 6-6513  1/1994  Japan .

*Primary Examiner*—Matthew S. Smith
*Assistant Examiner*—Hoang Ngo
*Attorney, Agent, or Firm*—Robert E. Bushnell, Esq.

[57] ABSTRACT

A minimized office machine wherein an extendable original document stacker doubles as a guiding unit for manual paper feeding and a paper supply cassette is subjacent to the scanning and/or electrophotographic mechanisms, defining a U-shaped paper path.

20 Claims, 5 Drawing Sheets

MINIMIZED OFFICE AUTOMATED MACHINE

CLAIM OF PRIORITY

This application makes reference to, incorporates the same herein, and claims all benefits accruing under 35 U.S.C. §119 from an application entitled MINIMIZED OFFICE AUTOMATED MACHINE earlier filed in the Korean Industrial Property Office on Aug. 30, 1996, and there duly assigned Serial No. 96-37156 by that Office.

BACKGROUND OF THE INVENTION

1. Field of the Invention

The present invention relates to a multifunction electrophotography developing apparatus. Specifically, this invention relates to a document flow path incorporated in a minimized office automated machine.

2. Discussion of the Prior Art

Facsimile and copy machines have become essential equipment in almost every office. These machines often are quite bulky. The typical facsimile machine includes a sending tray that holds documents to be scanned and transmitted over the phone lines to another party; a scanner; a document tray that holds the documents after they are transmitted; a supply tray that supplies paper to the electrophotographic image transfer area; an electrophotographic image transferring system; and a message tray receiving papers onto which images were transferred. Typically the sending tray is positioned on one side of the machine, while the document tray is positioned on the other side of the machine. Similarly, the supply tray often is positioned on one side of the machine, while the message tray is positioned on the other side of the machine. These awkward arrangements result in a machine having an inordinate length which is not easily managed in a small office. What is needed is a compact electrophotography apparatus which utilizes a flow path that permits the supply and output trays to be positioned in a stacked configuration.

U.S. Pat. No. 5,329,373 for a Facsimile Apparatus Having Original Document and Recording Medium Conveying Systems issued to Hayashi et al., describes a facsimile apparatus having a housing in which the scanning portion is positioned at one end of the housing and the electrophotographic transfer portion is disposed at the other end of the housing. An internally installed paper cassette is located between the scanning and electrophotographic transfer units. The is tray which receives papers to which images have been transferred has an opening through which manually fed paper may be introduced.

U.S. Pat. No. 5,559,609 for a Facsimile Transceiver issued to Yamada et al., describes a facsimile apparatus including a paper tray which is located below the scanning and image transferring units.

U.S. Pat. No. 5,552,902 for a Facsimile Apparatus with Internal Mechanism for Conveying Originals and Recording Paper issued to Kohno, describes a facsimile apparatus including an internally mounted paper supply which is disposed below the scanning apparatus.

U.S. Pat. No. 5,038,228 for a Sheet Transport Apparatus of Printer Having Scanner Unit issued to Takada, describes an apparatus including a scanner disposed above an image transfer unit, both being generally in registry with an internally mounted paper supply.

U.S. Pat. No. 5,387,980 for a Device For Sending And Receiving Graphical Documents Via Teletransmission Lines issued to Baitz et al., describes a device including a tray which received documents which were scanned as well as documents that received images.

Clearly, the above demonstrates a need for a compact electrophotographic apparatus having flow path characteristics that allow for stacked output and input tray configurations.

SUMMARY OF THE INVENTION

The present invention overcomes the limitations described above and provides a compact electrophotographic office tool that is more manageable in a small office. The invention provides a facsimile machine in which a stacker for a discharged original document doubles as a guide for a manual paper supply. The invention also provides a paper supply cassette mounted under the printing unit. The minimized office automated machine includes a scanning unit having a feed passage through which an original document is conveyed along, read by a reading unit, and discharged. A printing unit, having a pick-up roller installed under the scanning unit, receives paper from a subjacent paper supply which is directed through an image formation and transferring unit prior to being fixed by a fixing unit and discharged to a discharged-paper stacker. The record paper is conveyed from the record paper cassette to the image formation unit, defines a U-shape conveyance path. A manual paper supply is provided near the paper discharge opening in the scanning unit. The manual paper supply guide serves both as a recording paper guide and a discharged-paper stacker to which an original document is discharged from the scanning unit.

Accordingly, an object of the invention is to provide a minimized office automated machine that is reduced in length.

Additional features and advantages of the invention will be set forth in the following description and drawings which follows.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT(S)

Figure 1:
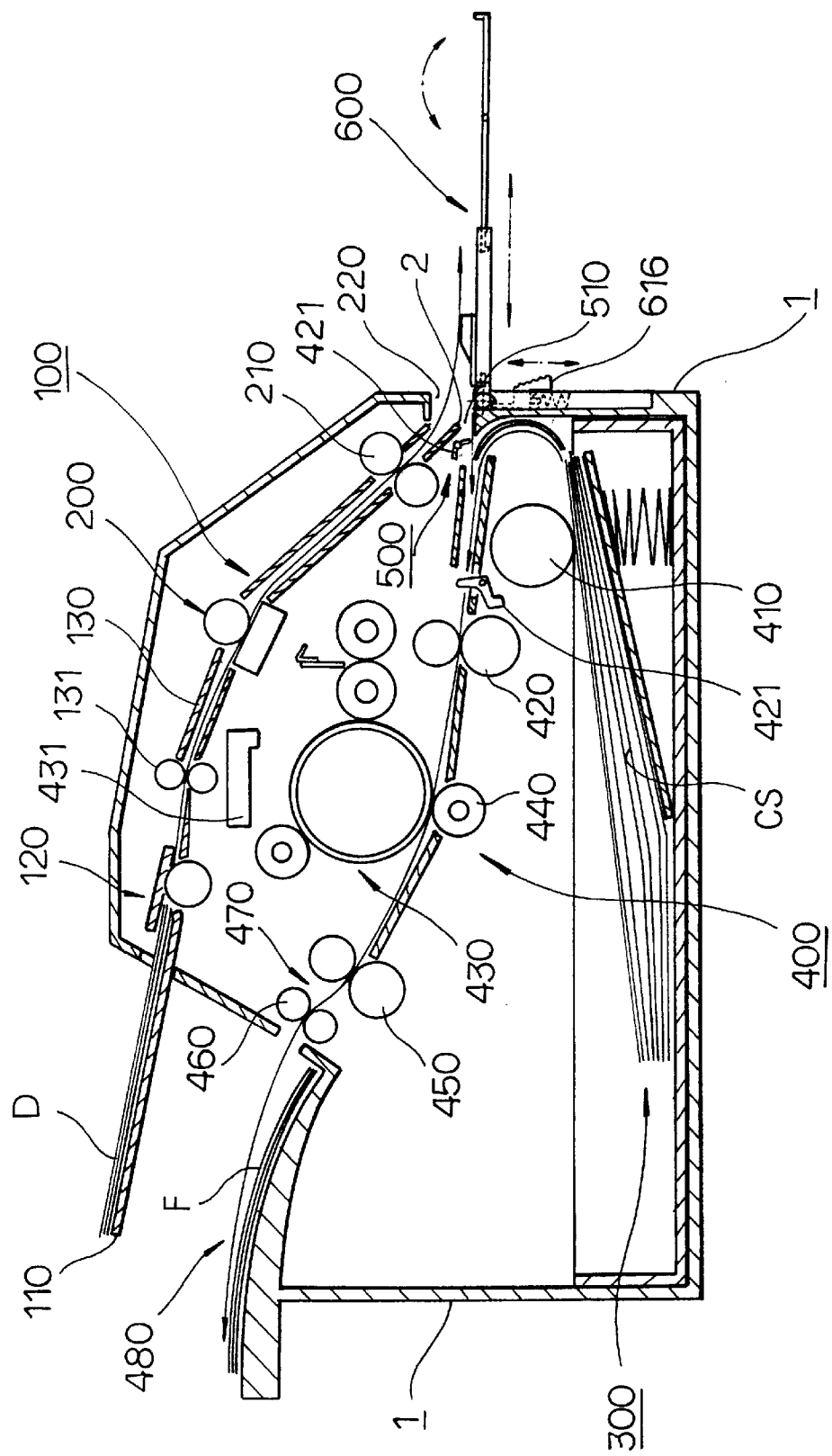
FIG. 1 is a vertical cross sectional detail view of the present automated electrophotography machine, according to the present invention.
Figure 2:
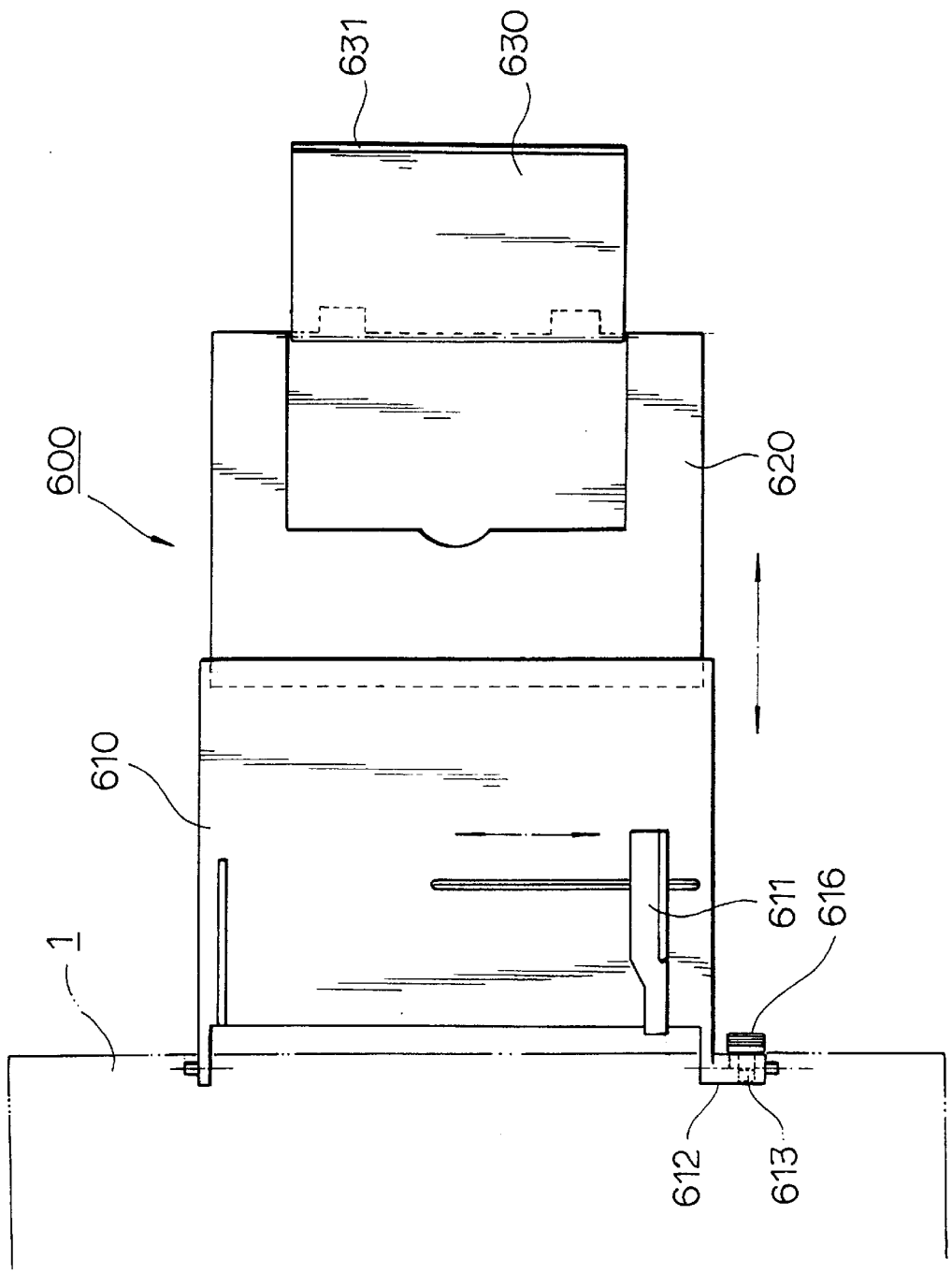
FIG. 2 is a plan view of a manual paper supply guide according to the present invention.
Figure 3:
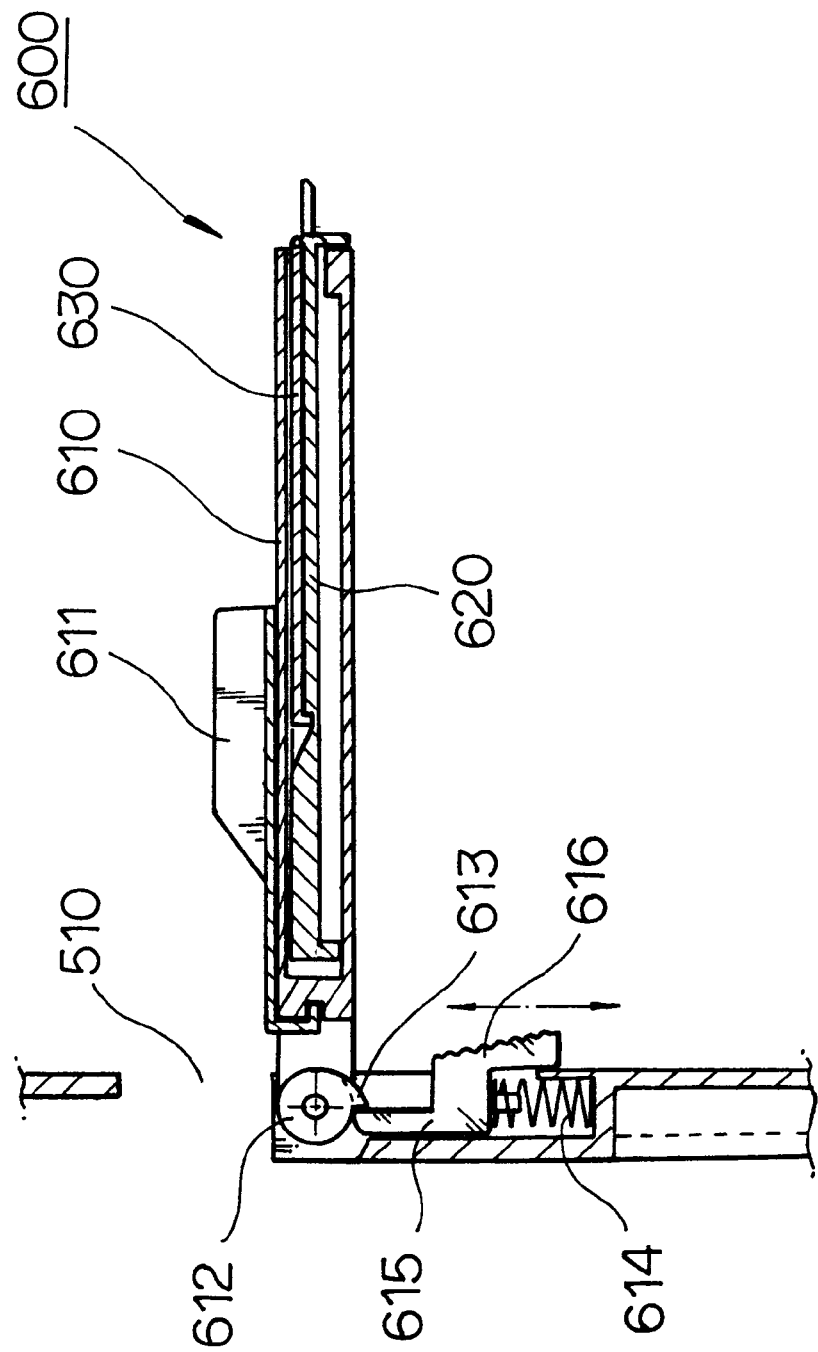
FIGS. 3, 4 and 5 are vertical cross sectional detail view of the manual paper supply guide, according to the present invention.
Figure 4:
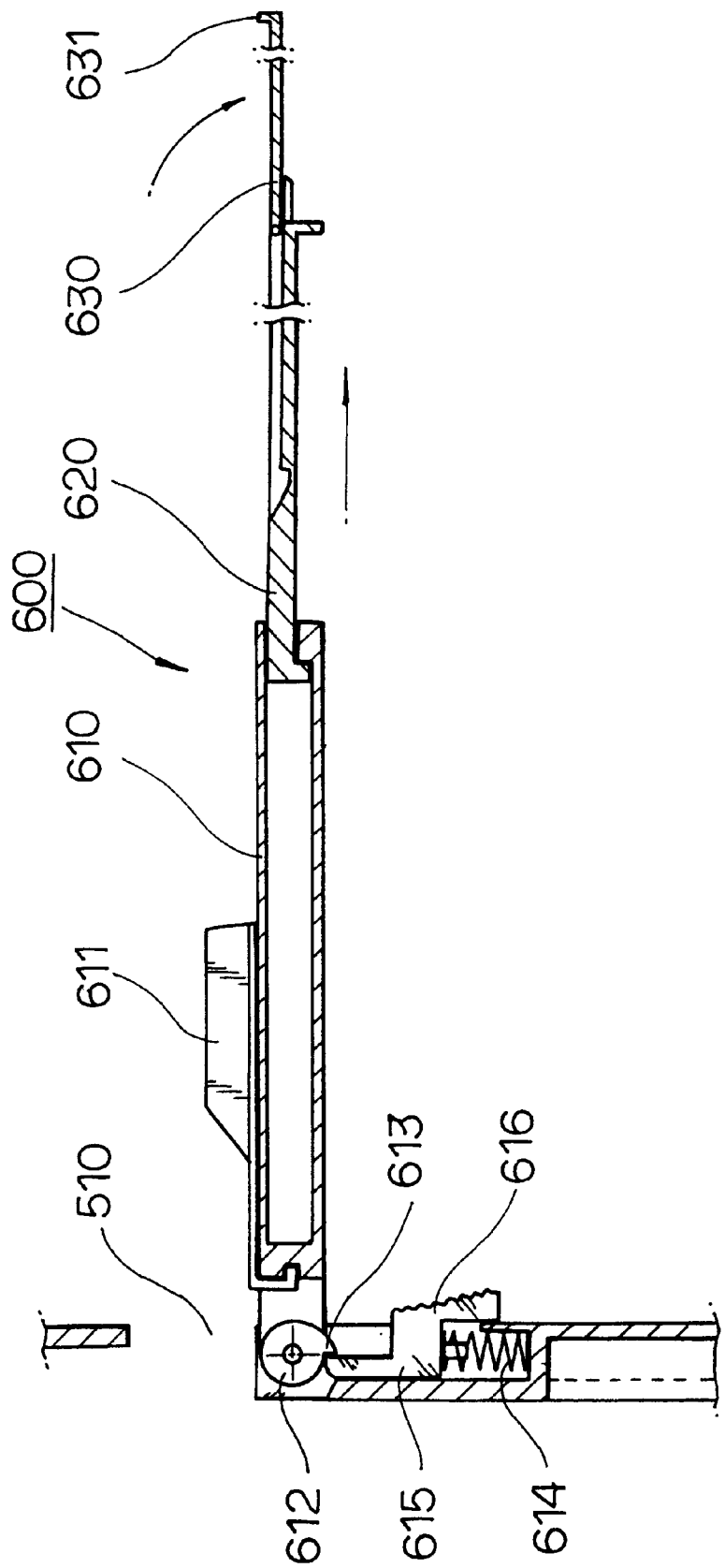
Figure 5:
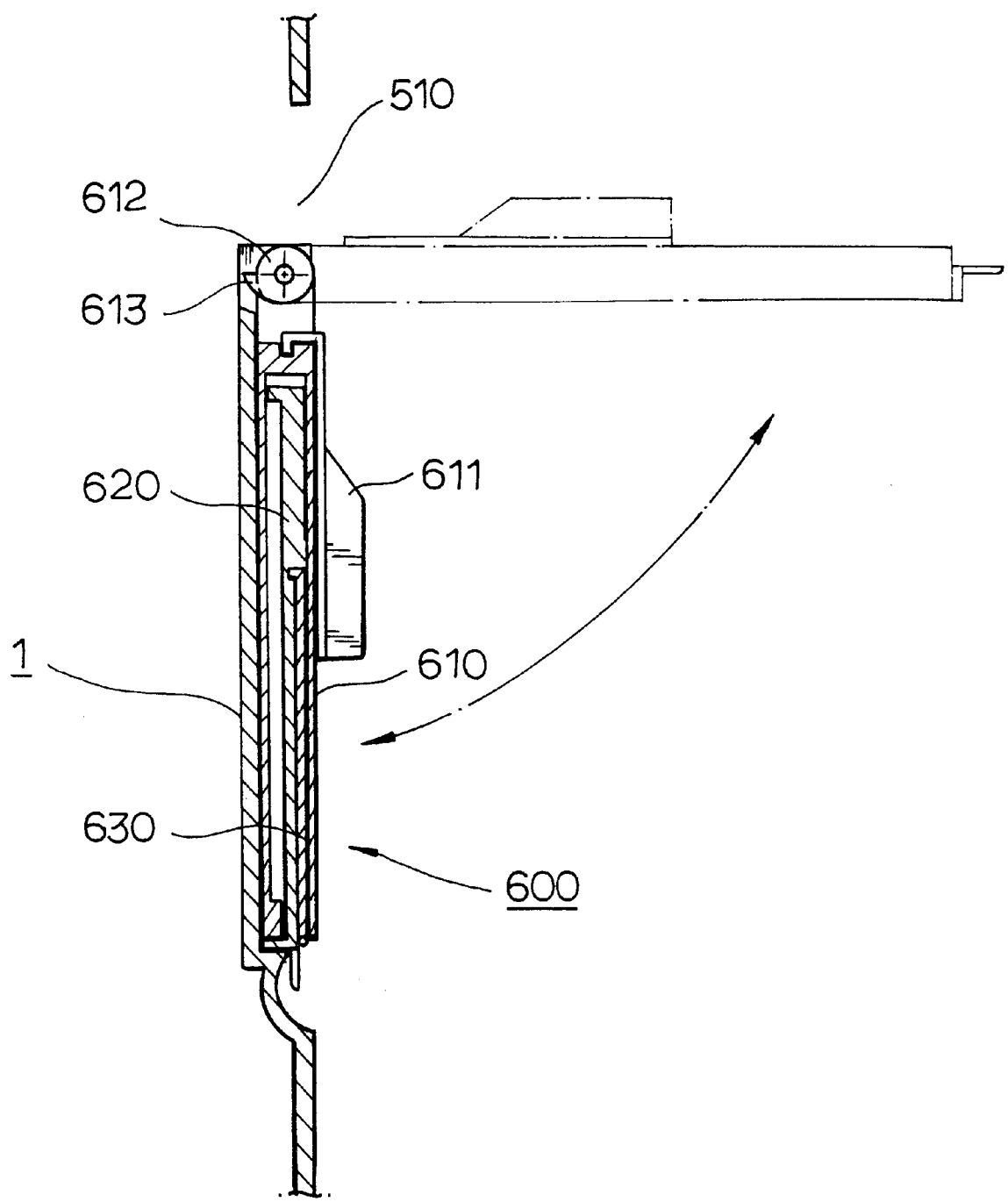

As shown in FIG. 1, a facsimile machine 1 according to the present invention includes a scanning unit 100, paper cassette 300, printing unit 400, and manual paper supply unit 500.

Scanning unit 100 includes an original document support 110 where original document D is loaded. The original document D is fed into automatic document conveyance roller 120 and passes through feed passage 130 propelled by feed rollers 131. The document D is read by reading unit 200, then discharged by discharge roller 210 onto the manual paper supply guide 600 through paper discharge opening 220. Thus, manual paper supply guide 600 also is used as a discharged-paper stacker for the original document D.

In printing unit 400, individual recording papers CS pass from cassette 300 through a registration sensor 421 and registration rollers 420. An image is transferred onto the record paper CS by image formation unit 430 and transferring unit 440.

The image formed on the paper CS is fixed with high pressure and heat by the fixing unit 450. The fixed paper F then is conveyed along discharge passage 470 to discharged-paper stacker 480 by discharge rollers 460. Discharged-paper stacker 480 is installed under original document support 110 and configured for conveniently taking out the paper discharged to discharged-paper stacker 480.

The paper cassette 300 is installed under printing unit 400. The paper cassette 300 is removably, internally installed in main body case 1. The paper CS contained in record paper cassette 300, is individually withdrawn by pick-up roller 410 and conveyed from record paper cassette 300 to transferring unit 440 and image formation unit 430, defining a U-shaped conveyance path.

The scanning unit 100 may be installed over the printing unit 400. The scanning unit 100 defines a conveyance path having nearly the same length as the record paper conveyance path. Since scanning unit 100, printing unit 400, and record paper cassette 300 are installed in a stacked configuration, the length of main body case 1 containing them may be minimized. Configuring the main body case 1 to define a discharged-paper stacker 480 may add unnecessary length, but is convenient and shown for illustrative purposes only. The whole length of the facsimile device may be decreased.

The main body case 1 and inner frame 2 define a manual paper supply opening 510. Manual paper supply unit 500, including manual paper supply sensor 520 which senses when paper is supplied through the manual paper supply unit 500, is installed beside the manual paper supply opening 510. A manual paper supply guide 600 is installed near the manual paper supply unit 500. When the paper is guided by manual paper supply guide 600 through the manual paper supply opening 510, manual paper supply sensor 520 sends a signal to CPU. CPU recognizes that paper is manually supplied, and conveys the paper to printing unit 400 to perform printing. The manual paper supply guide 600 serves both as a discharged-paper stacker, where an original document D is discharged, and a guide for recording paper manually supplied.

FIGS. 2 to 5 show an embodiment of an extendable manual paper supply guide 600 according to the present invention. First changeable portion 620 is installed in guide main body 610, and may be withdrawn when needed. Second changeable portion 630, which is connected to the end of the first changeable portion 620, may be folded out when needed. Protrusion 631 at the end of second changeable portion 630 prevents dislocation of a discharged document. The guide main body 610 includes a size changing unit 611 for accommodating papers of differing widths. The extendable manual paper supply guide 600 is much shorter than a conventional paper cassette, thus minimizing the size of the apparatus.

Guide main body 610 is pivotally connected to the main body case 1 with hinge pin 612. Keeper 613, formed on hinge pin 612, is kept by stopper 615, biased thereagainst by spring 614. When not needed, the manual paper supply guide 600 may be folded against to main body case 1 by pulling down stopper button 616 to release keeper 613 from stopper 615.

Those skilled in the art will appreciate that various modifications and variations may be made in the present length-reduced, multifunction apparatus using an electrophotography developing method without deviating from the spirit or scope of the invention as claimed.

What is claimed is:

1. An electrophotography apparatus comprising a housing having a port, said port discharging from said housing documents bearing images scanned by the apparatus, said port receiving into said housing media, and said apparatus conveying the media received into said apparatus via said port while printing images onto the media.

2. The apparatus of claim 1, further comprising a tray receiving the documents while said tray is supported by said housing.

3. The apparatus of claim 2, said tray being extensible.

4. The apparatus of claim 1, further comprising:
   a scanning unit positioned within said housing while reading the documents prior to said discharging;
   a printing unit positioned within said housing while printing said images onto the media; and
   a media supply cassette providing a source of the media for said printing unit that is alternative to media introduced into said apparatus via said port;
   said scanning unit, said printing unit, and said media supply cassette being generally aligned along a plurality of paths accommodating conveyance ofthe documents and media through said apparatus.

5. The apparatus of claim 4, said scanning unit, said printing unit, and said media supply cassette being generally aligned along a line transverse to a surface of a document or medium being conveyed through said apparatus.

6. The electrophotographic apparatus of claim 1, further comprising:
   an automatic media supply introducing the media into a first path of conveyance through said apparatus;
   a printing unit being disposed along said first path of conveyance and forming images upon the media furnished by said port and by said automatic media supply;
   a scanning unit generating data corresponding to information read from the documents being conveyed along a second and different path of conveyance through said apparatus to said port; and
   a manual media supply guide being disposed in proximity to said port and accommodating manual introduction of media into said first path of conveyance and receiving the scanned documents discharged from said second path of conveyance.

7. An apparatus comprising:
   a housing having a port, said port receiving into said housing recordable media, said port conveying the recordable media toward a printing unit, and said port discharging from said housing scanned documents; and
   a tray being mounted on said housing and being disposed to receive the scanned documents discharged from said port.

8. The apparatus of claim 7, said tray being extensible.

9. The apparatus of claim 7, further comprising:
   a scanning unit reading the documents prior to said discharging;

a printing unit; and a media supply cassette providing a source of the recordable media for said printing unit that is alternative to said port;

said scanning unit, said printing unit, and said media supply cassette being generally aligned.

10. The apparatus of claim 9, said scanning unit, said printing unit, and said media supply cassette being generally aligned along a line transverse to a surface of a document or recordable medium being conveyed through said apparatus.

11. The apparatus of claim 7, further comprising:

an automatic media supply corresponding to an alternative source of the media, said automatic media supply feeding the media into a first path of conveyance through said apparatus;

a printing unit being disposed along said first path and forming images upon the media furnished by said automatic media supply and upon media introduced through said port;

a scanning unit generating data corresponding to information read from the documents being conveyed along a second and different path of conveyance through said apparatus to said tray.

12. An electrophotographic apparatus, comprising:

a housing having a port, said port discharging from said housing original documents, said port receiving into said housing recording media;

an automatic media supply being positioned to introduce recording media into a first path of conveyance through said apparatus;

a printing unit being disposed along said first path and forming images upon recording media furnished by said automatic media supply;

a scanning unit generating data corresponding to information read from original documents conveyed along a second and different path of conveyance through said apparatus; and a manual media supply guide being disposed at said port, accommodating manual introduction of recording media into said first path of conveyance, and receiving the original documents discharged from said second path of conveyance, said manual media supply guide being extensible.

13. The electrophotographic apparatus of claim 12, said manual media supply guide being positioned at a location intermediate to said first path of conveyance where said second path of conveyance terminates.

14. The electrophotographic apparatus of claim 12, said first path of conveyance being below said second path of conveyance.

15. The electrophotographic apparatus of claim 14, further comprising:

said housing encasing said printing unit and said scanning unit;

said manual media supply guide being pivotally supported by said housing, said manual media supply guide rotating between a first position being intermediate to said first path of conveyance and terminating said second path of conveyance, and a second position being disposed along a side wall of said housing.

16. The electrophotographic apparatus of claim 12, further comprising:

a first stacker positioned as a first terminal of said second path of conveyance, to introduce the original documents into said second path of conveyance;

said automatic media supply being positioned as a first terminal of said first path of conveyance;

a second stacker positioned below said first stacker as a second terminal of said first path of conveyance, said second stacker receiving the recording media discharged from said first path of conveyance.

17. The electrophotographic apparatus of claim 16, further comprising:

said housing encasing said printing unit and said scanning unit; and said manual media supply guide being pivotally supported by said housing, said manual media supply guide rotating between a first position being intermediate to said first path of conveyance while simultaneously forming a second terminal of said second path of conveyance, and a second position being disposed along a side wall of said housing.

18. The electrophotographic apparatus of claim 12, further comprising:

a first stacker being positioned as a first terminal of said second path of conveyance and introducing the original documents into said second path of conveyance;

said automatic media supply being positioned as a first terminal of said first path of conveyance;

said manual media supply guide being positioned as a second terminal of said second path of conveyance at a location intermediate to said first path of conveyance; and a second stacker being positioned below said first stacker as a second terminal of said first path of conveyance, said second stacker receiving the recording media discharged from said first path of conveyance.

19. The electrophotographic apparatus of claim 12, further comprising:

said housing encasing said printing unit and said scanning unit;

said manual media supply guide being pivotally supported by said housing, said manual media supply guide rotating between a first position being intermediate to said first path of conveyance and terminating said second path of conveyance, and a second position being disposed along a side wall of said housing.

20. The electrophotographic apparatus of claim 12, further comprising:

a first stacker being positioned as a first terminal of said second path of conveyance and introducing the original documents into said second path of conveyance;

said automatic media supply being positioned as a first terminal of said first path of conveyance;

a second stacker being positioned below said first stacker as a second terminal of said first path of conveyance, said second stacker receiving the recording media discharged from said first path of conveyance;

said housing encasing said printing unit and said scanning unit; and said manual media supply guide being pivotally supported by said housing, said manual media supply guide rotating between a first position being intermediate to said first path of conveyance while simultaneously forming a second terminal of said second path of conveyance, and a second positionbeing disposed along a side wall of said housing.

* * * * *